(12) United States Patent
Dhanabalan

(10) Patent No.: US 10,104,001 B2
(45) Date of Patent: Oct. 16, 2018

(54) SYSTEMS AND METHODS TO EARLY DETECT LINK STATUS OF MULTIPLE PATHS THROUGH AN EXPLICIT CONGESTION NOTIFICATION BASED PROXY

(71) Applicant: Citrix Systems, Inc., Fort Lauderdale, FL (US)

(72) Inventor: Praveen R. Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 128 days.

(21) Appl. No.: 15/251,807

(22) Filed: Aug. 30, 2016

(65) Prior Publication Data
US 2018/0063009 A1   Mar. 1, 2018

(51) Int. Cl.
*H04L 12/26* (2006.01)
*H04L 12/823* (2013.01)
*H04W 28/02* (2009.01)
*H04L 12/825* (2013.01)

(52) U.S. Cl.
CPC .............. *H04L 47/32* (2013.01); *H04L 47/25* (2013.01); *H04W 28/0284* (2013.01)

(58) Field of Classification Search
CPC ..... H04L 47/32; H04L 47/25; H04W 28/0284
USPC .......................................................... 370/235
See application file for complete search history.

(56) References Cited

U.S. PATENT DOCUMENTS

| | | | |
|---|---|---|---|
| 8,948,009 B1* | 2/2015 | Hasan | H04L 47/193 370/231 |
| 2008/0037420 A1* | 2/2008 | Tang | H04L 1/1607 370/229 |
| 2011/0075563 A1* | 3/2011 | Leung | H04L 12/66 370/236 |

* cited by examiner

*Primary Examiner* — Sai Ming Chan
(74) *Attorney, Agent, or Firm* — Fox Rothschild LLP; Robert J. Sacco; Carol E. Thorstad-Forsyth

(57) ABSTRACT

Systems and methods for early detection of link status of multiple paths through a first network. The methods comprise: receiving, by a first network appliance, a first packet sent from a second network appliance over a first data link established between the first and second network appliances which support Explicit Congestion Notification ("ECN"); determining, by the first network appliance, whether a quality of the first data link indicates future congestion in the first network; and communicating a packet drop notification from the first network appliance to a first end node over a second data link established in a second network different from the first network if (a) the quality of the first data link does indicate future congestion and (b) an ECN bit contained in a header of the first packet is marked. The first end node is incompatible or does not support ECN.

12 Claims, 6 Drawing Sheets

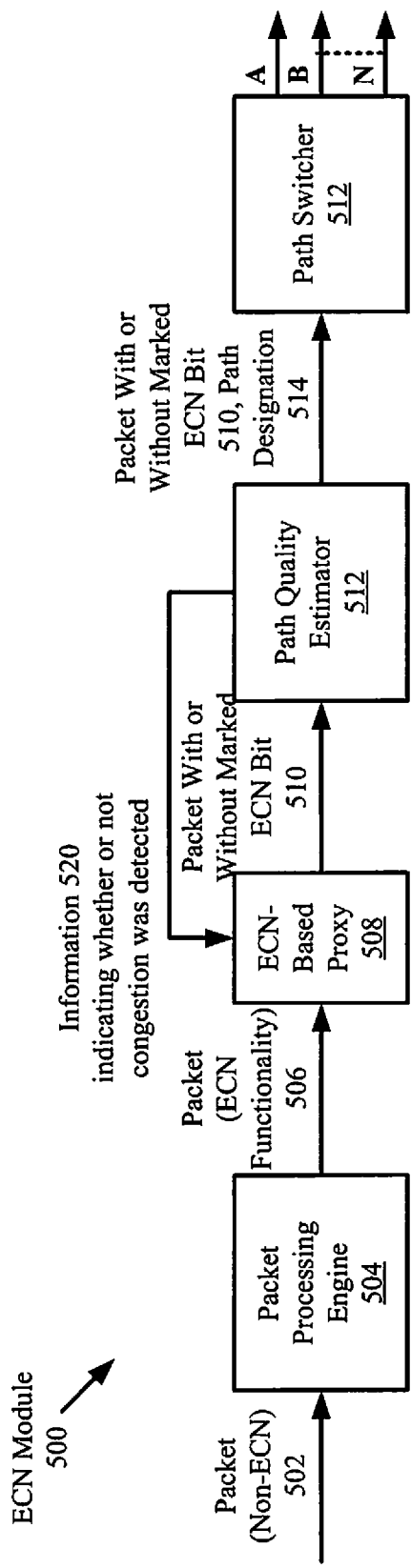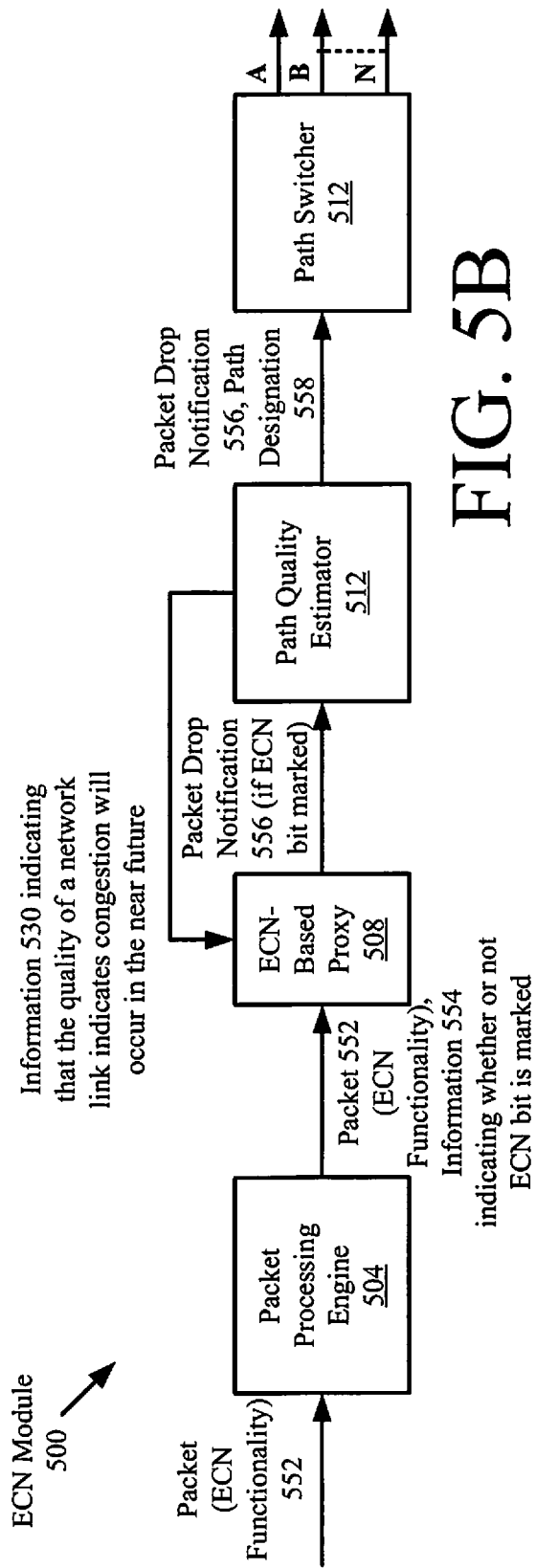
FIG. 5A
FIG. 5B

Note: Client and Server are not ECN compatible

SYSTEMS AND METHODS TO EARLY DETECT LINK STATUS OF MULTIPLE PATHS THROUGH AN EXPLICIT CONGESTION NOTIFICATION BASED PROXY

FIELD OF THE INVENTION

This document relates generally to networks. More particularly, this document relates to systems and methods for early detection of link status of multiple paths through an Explicit Congestion Notification ("ECN").

BACKGROUND OF THE INVENTION

A middlebox (or network appliance) is a network device that transforms, inspects, filters or otherwise manipulates traffic for various purposes. The middlebox can include, but is not limited to, a firewall, an Intrusion Detection System ("IDS"), a Network Address Translator ("NAT"), a Wide Area Network ("WAN") optimizer, a load balancer and a WAN virtualizer. The WAN virtualizer enables network managers to use multiple WAN connections to augment or replace individual private WAN connections. WAN virtualization is an end-to-end appliance solution. As such, two WAN virtualizers are needed to provide the multiple WAN connections. These two WAN virtualizers provide a pair of WAN virtualizers connected via different WAN networks. The WAN virtualizers determine the best link to send the high priority packets (traffic) by determining the packet loss, latency, jitter, congestion and other network entities from each of the paths.

SUMMARY

The present document generally relates to implementing systems and methods for early detection of link status of multiple paths through a first network (e.g., a WAN network). The methods involve: receiving, by a first network appliance, a first packet sent from a second network appliance over a first data link established between the first and second network appliances which support ECN; determining, by the first network appliance, whether a quality of the first data link indicates future congestion in the first network; and communicating a packet drop notification from the first network appliance to a first end node over a second data link established in a second network different from the first network if (a) the quality of the first data link does indicate future congestion and (b) an ECN bit contained in a header of the first packet is marked. The first end node is incompatible with ECN. The packet drop notification falsely indicates a second packet as having been dropped by the first network appliance.

The packet drop notification causes the first end node to reduce a throughput and resend the second packet to the first network appliance. An ACK packet is communicated from the first network appliance to the first end node in response to a reception of the second packet. The first network appliance drops the second packet since it was already successfully communicated to the second network appliance.

The first network appliance may also receive a third packet sent from the first end node over the second data link. The first network appliance marks an ECN bit contained in a header of the third packet if congestion in the first network is detected. The third packet with the marked ECN bit is communicated from the first network appliance to the second network appliance over the first data link. The third packet is then communicated from the second network appliance to a second end node over a third data link established in a third network different from the first network. The second end node is incompatible with ECN.

DESCRIPTION OF THE DRAWINGS

Embodiments will be described with reference to the following drawing figures, in which like numerals represent like items throughout the figures, and in which:

FIGS. 5a and 5b (collectively referred to as "FIG. 5") are illustrations of other exemplary architectures for an ECN module.

DETAILED DESCRIPTION OF THE INVENTION

Figure 1:
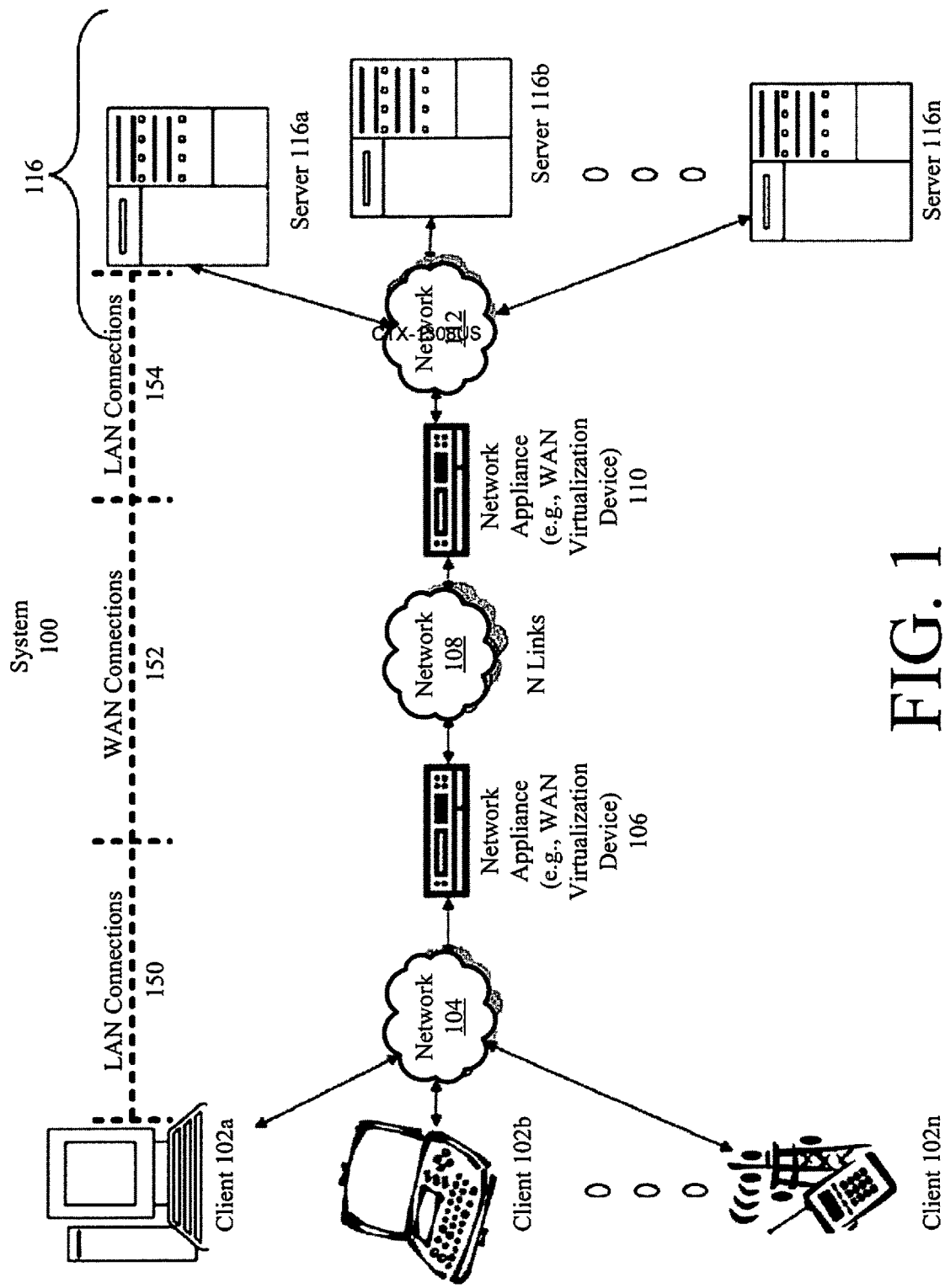
FIG. 1 is an illustration of an exemplary system in which WAN virtualization is employed.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns systems and methods for detection of link status of multiple paths through an ECN. During operation, a network appliance (e.g., a WAN virtualization device) performs operations to early detect congestion for multiple paths through a network, reactively select quality links, and proxy ECN benefits (e.g., reduced packet drops and early congestion notification) to client devices. In this regard, the network appliance is configured to monitor the quality of links established between itself and another network appliance (e.g., another WAN virtualization device). The quality of links (or link quality) is determined based on latency, packet drop, packet jitter, and bandwidth. During operations, a packet is dropped when network congested exits. In this case, the packet is resent by the network appliance.

ECN can early notify end-to-end congestion without dropping packets. ECN deployment in an end user (e.g., a client) and the core routers have increased a lot over the last few years. After the end-to-end clients successfully negotiate ECN, the routers in between can mark the packet instead of dropping the packet due to congestion. The mark indicates that network congestion is going to occur in the near future. The mark comprises information added to the packet's header (e.g., an ECN Flag value is set to one (1) or zero (0)). For example, in a non-ECN scenario, a queue of the network appliance has one hundred (100) packets, and will drop the $101^{st}$ packet because network congestion exists. In contrast, in an ECN scenario, a queue threshold is employed when the network appliance determines that network congestion is likely to occur in the near future based on a detected link quality. The queue threshold is known as a Random Early Detection ("RED") threshold. After the queue threshold (e.g., 70 packets) is reached, the network appliance marks the remaining packets (e.g., the last 30 packets of the 100 packets) to indicate that network congestion is going to occur in the near future. Thereafter, the marked packets are sent to an end-user device. In response to the mark, the end-user device adjusted its throughput so as to prevent future packet drops. Since ECN can detect early congestion, the present solution can be effectively used to detect path status across a network appliance, such as a Wide Area Network ("WAN") virtualization device. As such, the present solution adds an ECN proxy to network appliances.

The present solution generally concerns proxying packets sent from a first network node (e.g., a client) to a second network node (e.g., a server). The proxying is achieved by: marking an ECN bit in an ACK packet sent from a first network appliance to a second network appliance; determining at the second network appliance that the quality of the WAN data link indicates congestion in the near future; sending a packet drop notification from the second network appliance to an end node (e.g., a client or server) if the ECN bit was set in the ACK packet; receiving a data packet resent from the end node in response to the packet drop notification; sending an ACK packet from the second network appliance to the end node; and dropping the resent data packet by the second network node.

In sum, the present solution is able to: (a) set ECN marks on incoming TCP/IP packets to negotiate ECN between two network appliances across a WAN; remove ECN marks on the data packets when sent from the network appliances to end nodes (e.g., clients/servers); obtains flow and path information from a path quality estimator module; and provides early indications of network congestion to the end nodes.

By implementing the above described proxying technique, the present solution can early detect congestion for multiple links and can be reactive to take decisions to select quality links. Further, the end nodes can benefit from ECN functionality (e.g., reduced packet drops between to end nodes and early congestion notification).

Exemplary System Implementing Network Virtualization

Referring now to FIG. 1, there is provided an illustration of an exemplary system 100. System 100 comprises a plurality of clients 102a, 102b, . . . , 102n (collectively referred to as "clients 102") in communication with a plurality of servers 116a, 116b, . . . , 116n (collectively referred to as "servers 116") via at least one network 104, 108, 112. Each client 102 has the capacity to function as both a client node seeking access to applications on a server 116 and as an application server providing access to hosted applications for other clients. For example, a client 102a requests execution of various applications hosted by the servers 116 and receives outputs of the results of the application execution for display. In some scenarios, the clients 102 reside in a branch office of a business organization.

Servers 116 include, but are not limited to, file servers, application servers, web servers, proxy servers, and/or gateway servers. Each server 116 may have a capacity to function as either an application server or as a master application server. Each server 116 may include an active directory. In some scenarios, one or more of the servers 116 receive(s) requests from clients 102, forwards the requests to other servers, and responds to the requests. In some scenarios, the servers 116 reside in a data center of the business organization or another business organization.

As shown in FIG. 1, the clients 102 communicate with servers 116 via a pair of network appliances 106, 110. The network appliances 106, 110 are designed, configured or adapted to facilitate the proxying of client based on an ECN proxy. As such, the network appliances 106, 110 comprise WAN virtualization devices with ECN-based proxy. The WAN virtualization devices are generally configured to facilitate: the optimization, securement and control of the delivery of enterprise and cloud services; and maximize the end user experience for all users (including mobile clients).

Network appliance 106 is connected to clients 102 via network 104. Network appliance 106 is also connected to network appliance 110 via network 108. Network appliance 110 is connected to servers 116 via network 112. Networks 104, 108, 112 can be the same type of networks or different types of networks. Each network 104, 112 can include, but is not limited to, a Local Area Network ("LAN"). The LAN includes, but is not limited to, an Intranet. The networks 104, 112 can be public networks, private networks or a combination of public and private networks. Network 108 comprises a WAN. The WAN includes, but is not limited to, the Internet or the WWW. The topology of each network 104, 108, 112 may be a bus, star or ring network typology.

Figure 2:
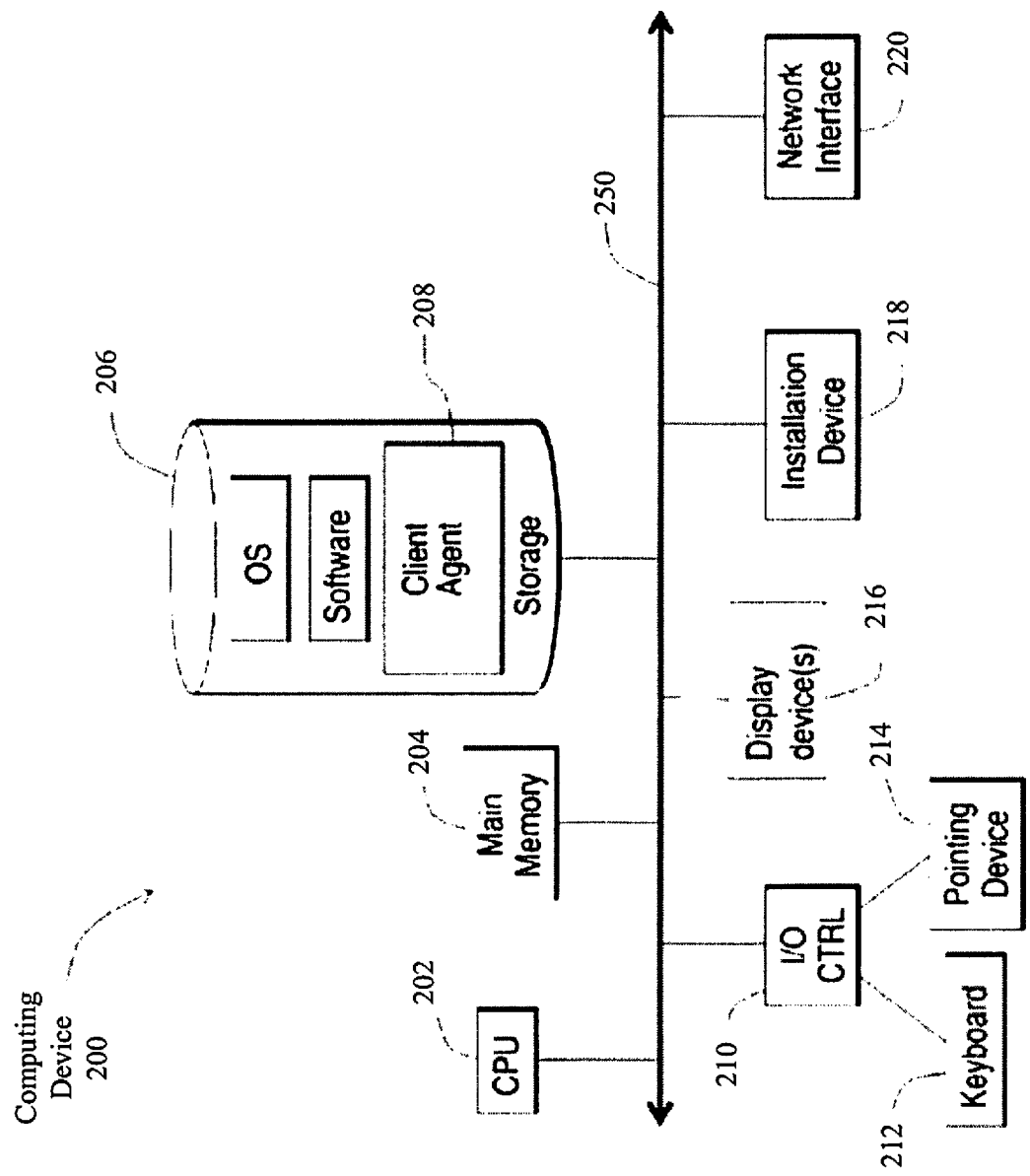
FIG. 2 is an illustration of an exemplary computing device.

Referring now to FIG. 2, there is provided an illustration of an exemplary computing device 200. The clients 102 and servers 116 may be the same as or substantially similar to computing device 200. As such, the discussion of computing device 200 is sufficient for understanding components 102, 116 of FIG. 1. Computing device 200 includes, but is not limited to, a workstation, a desktop computer, a laptop computer, a notebook computer, a server, a handheld computer, a mobile telephone, and/or a smart phone.

As shown in FIG. 2, the computing device 200 comprises a Central Processing Unit ("CPU") 202, a main memory 204, at least one display device 216, a keyboard 212, and a pointing device 214 (e.g., a mouse). The computing device 200 may also include additional optional elements. The optional elements include, but are not limited to, Input/Output ("I/O") devices 310, 312, a bridge 312 and a cache 304 in communication with the CPU 202, as shown in FIG. 3.

The CPU 202 is any logic circuitry that responds to and processes instructions fetched from the main memory 204. In some scenarios, CPU 202 comprises a microprocessor. The microprocessor can include, but is not limited to, a microprocessor manufactured by (a) Intel Corporation of Mountain View, Calif., (b) Motorola Corporation of Schaumburg, Ill., (c) Transmeta Corporation of Santa Clara, Calif., (d) International Business Machines of White Plains, N.Y., (d) Advanced Micro Devices of Sunnyvale, Calif. The computing device 200 may be based on any of these processors, or any other processor capable of open as described herein.

Main memory 204 includes at least one memory device capable of storing data and allowing any storage location to be directly accessed by the CPU 202. In this regard, main memory 204 includes, but is not limited to, a Static Random Access Memory ("SRAM"), a burst SRAM, a synchBurst SRAM ("BSRAM"), a Dynamic Random Access Memory ("DRAM"), a Fast Page Mode DRAM ("FPM DRAM"), an Enhanced DRAM ("EDRAM"), an Extended Data Output RAM ("EDO RAM"), an Extended Data Output DRAM ("EDO DRAM"), a Burst Extended Data Output DRAM ("BEDO DRAM"), an Enhanced DRAM ("EDRAM"), a synchronous DRAM ("SDRAM"), a JEDEC SRAM, a PC100 SDRAM, a Double Data Rate SDRAM ("DDR SDRAM"), an Enhanced SDRAM ("ESDRAM"), a SyncLink DRAM ("SLDRAM"), a Direct Rambus DRAM ("DRDRAM"), and/or a Ferroelectric RAM ("FRAM").

Figure 3:
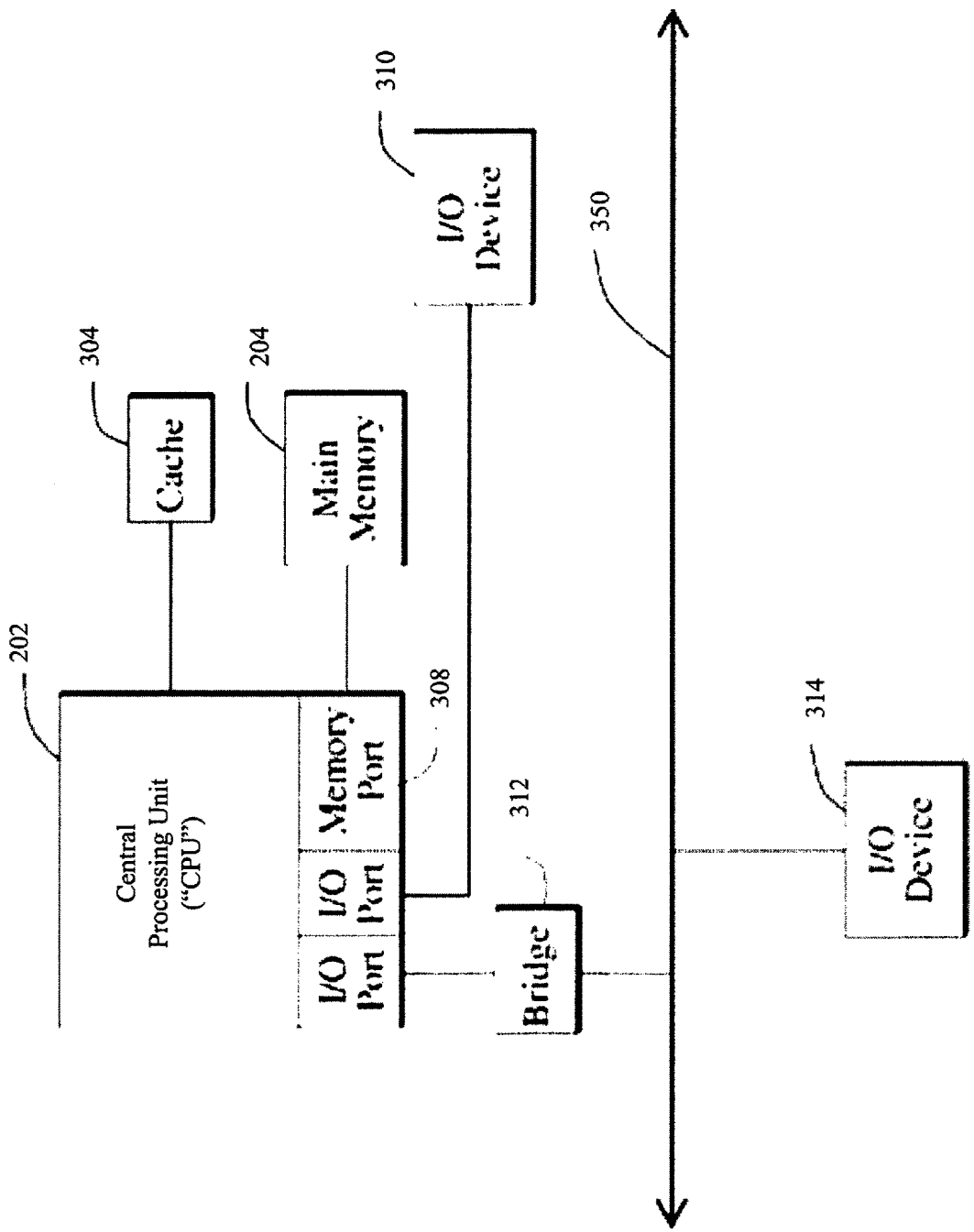
FIG. 3 is an illustration of an exemplary computing device.

In some scenarios, CPU 202 communicates with main memory 204 via a system bus 350 and/or a memory port 308, as shown in FIG. 3. CPU 202 also communicates with cache 304 via system bus 350 and/or a secondary bus (e.g., a backside bus). Cache 304 typically has a faster response time than main memory 204. Cache 304 includes, but is not limited to, an SRAM, a BSRAM and/or an EDRAM. CPU 202 may also communicate with various I/O devices 314 via system bus 350 and I/O devices 310 via a direct connection therewith. System bus 350 includes, but is not limited to, a VESA local bus, an Industry Standard Architecture ("ISA") bus, an Extended ISA ("EISA") bus, a Micro-Channel Architecture ("MCA") bus, a PCI bus, a PCI-X bus, a PCI-Express bus, and/or a NuBus. CPU 202 may further communicate with display device(s) 216 via an Advanced Graphics Port ("AGP").

I/O devices 310, 314 include, but are not limited to, keyboards, mice, trackpads, trackballs, microphones, drawing tablets, video displays, speakers, inkjet printers, laser printers, dye-sublimation printers, data stores, an installation medium and/or a bridge. I/O devices 310, 314 are controlled by an I/O controller 210.

Computing device 200 supports any suitable installation device 218 (e.g., a floppy disk drive, a CD-ROM drive, a CD-R/RW drive, a DVD-ROM drive, tape drives, USB device, hard-drive or any other device suitable for installing software and programs). Computing device 200 comprises a data store 206. Data store 206 includes, but is not limited to, at least one hard disk drive and/or a redundant array of independent disks. Data store 206 stores an Operating System ("OS"), other software and a client agent 208. In some scenarios, the installation device 218 is used as a data store. The OS and the software can be additionally or alternatively run from a bootable medium (e.g., a bootable CD such as KNOPPIX® and/or a bootable CD for GNU/Linux that is available as a GNU/Linux distribution from knoppix.net).

The OS controls scheduling of tasks and access to system resources. OS includes, but is not limited to, a Microsoft® Windows OS, a Unix and Linux OS, a Mac OS®, an embedded OS, a real-time OS, an open source OS, a proprietary OS, an OS for mobile computing devices, or any other OS capable of running on the computing device and performing the operations described herein.

Computing device 200 further includes a network interface 220. The network interface 220 provides an interface to at least one network. The network can include, but is not limited to, a LAN and/or a WAN. The network interface 118 includes, but is not limited to, a built-in network adapter, a network interface card, a PCMCIA network card, a card bus network adapter, a wireless network adapter, a USB network adapter, a modem or any other device suitable for interfacing the computing device 200 to any type of network capable of communication and performing the operations described herein.

Figure 4:
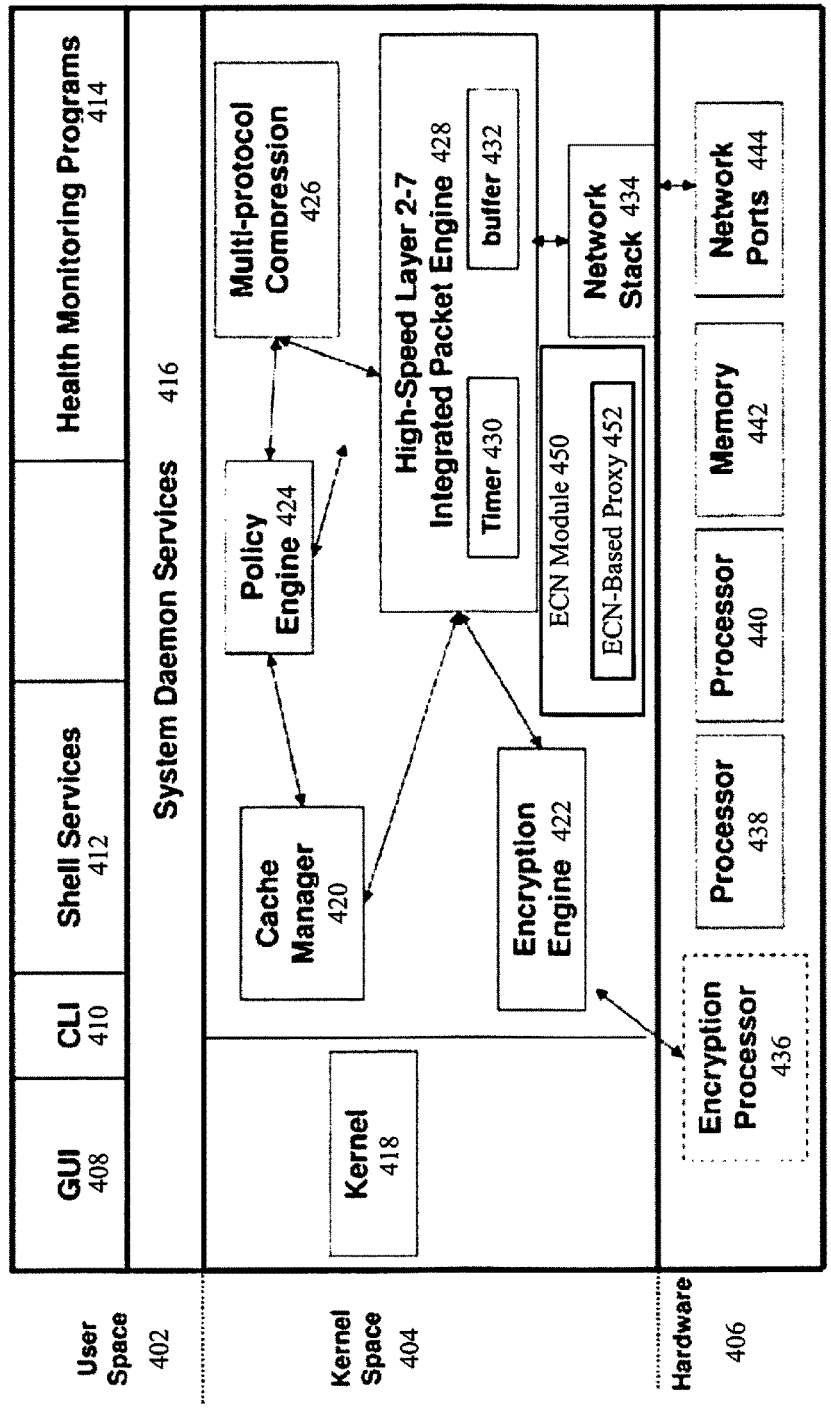
FIG. 4 is an illustration of an exemplary architecture for a network appliance (e.g., a WAN virtualizer) configured to process communications between client devices and servers.

Referring now to FIG. 4, there is provided an illustration of an exemplary architecture for a network appliance 400. Network appliances 106, 110 of FIG. 1 are the same as or substantially similar to network appliance 400. As such, the discussion of network appliance 400 is sufficient for understanding network appliances 106, 110 of FIG. 1. Network appliance 400 includes, but is not limited to, a WAN virtualization device (or WAN virtualizer).

As shown in FIG. 4, network appliance 400 comprises a hardware layer 406 and software layers 402, 404. The software layers include a user space 402 and a kernel space 404. Hardware layer 406 provides the hardware elements upon which programs and services within kernel space 404 and user space 402 are executed. Hardware layer 406 also provides the structures and elements which allow programs and services within kernel space 404 and user space 402 to communicate data both internally and externally with respect to network appliance 400. The hardware layer 206 includes at least one processor 438, 440 for executing software programs and services, a memory 442 for storing software and data, network ports 444 for transmitting and receiving data over a network, and an encryption processor 436 for performing functions related to Secure Sockets Layer ("SSL") and/or Transport Layer Security ("TLS") processing of data transmitted and received over the network.

An OS of network appliance 400 allocates, manages, or otherwise segregates the available system memory into kernel space 404 and user space 402. The OS includes, but is not limited to, a Microsoft® Windows OS, a Unix® OS, a Linux® OS, a Mac® OS, an embedded OS, a network OS, a real-time OS, an open source OS, a proprietary OS, and/or an OS for mobile computing devices or network devices.

Kernel space 404 is reserved for running the kernel 418. Kernel 418 includes, but is not limited to, device drivers, kernel extensions or other kernel related software. Kernel 418 is the core of the OS and provides access, control, and management of resources and hardware-related elements of the network appliance 400. Kernel space 404 also includes a number of network services or processes working in conjunction with a cache manager 420.

As shown in FIG. 4, kernel space 404 comprises a plurality of components 418-434. In some scenarios, components 422 and 428-434 alternatively reside in user space 402, instead of kernel space 404. Either architecture can be employed herein without limitation.

Network stack 434 (e.g., a TCP/IP based protocol stack and/or an HTTP/2.0 protocol stack) is provided for communicating with client devices (e.g., clients 102 of FIG. 1) and/or servers (e.g., servers 116 of FIG. 1). The network stack 434 is used to communicate with a first network (e.g., network 104 or 112 of FIG. 1) and a second network (e.g., network 108 of FIG. 1). In this regard, the network appliance 400 terminates a first transport layer connection (e.g., a LAN connection 150 of FIG. 1) to a client (e.g., client 102a of FIG. 1) and establishes a second transport layer connection (e.g., WAN connection 152 of FIG. 1) to another network appliance (e.g., network appliance 110 of FIG. 1). Alternatively or additionally, the network appliance 400 terminates a third transport layer connection (e.g., a LAN connection 154 of FIG. 1) to a server (e.g., server 116a of FIG. 1) and establishes a second transport layer connection (e.g., a WAN connection 152 of FIG. 1) to another network appliance (e.g., network appliance 106 of FIG. 1).

Kernel space 404 also comprises a cache manager 420, a high-speed layer 2-7 integrated packet engine 428, an encryption engine 422, a policy engine 424 and multi-protocol compression logic 426. Running these components or processes 420-428 in kernel space 404 or kernel mode instead of the user space 402 improves the performance of each of these components, alone and in combination.

Kernel operation means that these components or processes 420-428 run in the core address space of OS of the network appliance 400. For example, running the encryption engine 422 in kernel mode improves encryption performance by moving encryption and decryption operations to the kernel, thereby reducing the number of transitions between the memory space or a kernel thread in kernel mode and the memory space or a thread in user mode. Data obtained in kernel mode may not need to be passed or copied to a process or thread running in user mode, such as from a kernel level data structure to a user level data structure. The number of context switches between kernel mode and user mode are also reduced. Additionally, synchronization of and communications between any of the components or processes 420-428 can be performed more efficiently in the kernel space 404. In some scenarios, a portion of components or processes 420-428 run or operate in the kernel space 404, while other portions of these components or processes 420-428 run or operate in user space 402.

The network appliance 400 uses a kernel-level data structure providing access to any portion of one or more network packets (e.g., a network packet comprising a request from a client 102a of FIG. 1 or a response from a server 116a of FIG. 1). The kernel-level data structure is provided by the packet engine 424 via a transport layer driver interface or filter to the network stack 434. The kernel-level data structure comprises any interface and/or data accessible via the kernel space 404 related to the network stack 434 and network traffic or packets received or transmitted by the network stack 434. The kernel-level data structure may be used by any of the components or processes 420-428 to perform the desired operation of the component or process.

The cache manager 420 may comprise software, hardware or any combination of software and hardware to provide cache access, control and management of any type and form of content, such as objects or dynamically generated objects served by the originating servers (e.g., servers 116 of FIG. 1). The data, objects or content processed and stored by the cache manager 420 may comprise data in any format (e.g., a markup language) or communicated via any protocol. The cache manager 232 may duplicate original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than re-fetching or re-computing the original data, thereby reducing the access time. The cache memory element may additionally or alternatively comprise a data object in memory 442 of network appliance 400 and/or memory having a faster access time than memory 442. Cache manager 420 includes any logic, functions, rules, or operations to perform any operations of the network appliance 400 described herein. The cache manager 420 can comprise any type of General Purpose Processor ("GPP"), or any other type of Integrated Circuit ("IC").

The policy engine 424 may include, but is not limited to, an intelligent statistical engine or other programmable application(s). The policy engine 424 provides a configuration mechanism to allow a user to identify, specify, define or configure a caching policy. Policy engine 424 also has access to memory 442 to support data structures to enable user-selected caching policy decisions. The policy engine 424 may comprise any logic, rules, functions or operations to determine and provide access, control and management of objects, data or content being cached by the network appliance 400 in addition to access, control and management of security, network traffic, network access, compression or any other function or operation performed by the network appliance 400.

The encryption engine 422 comprises any logic, business rules, functions or operations for handling the processing of any security related protocol or any function related thereto. For example, the encryption engine 422 encrypts and decrypts network packets communicated via the network appliance 400. The encryption engine 422 may also setup or establish SSL or TLS connections on behalf of a client (e.g., clients 102 of FIG. 1), servers (e.g., servers 116 of FIG. 1), or network appliance 400. As such, the encryption engine 422 provides offloading and acceleration of SSL processing. The encryption engine 422 may use a tunneling protocol to provide a Virtual Private Network ("VPN") between two network appliances and/or between a client and a server.

The Multi-Protocol Compression Engine ("MPCE") 426 comprises any logic, business rules, function or operations for compressing one or more protocols of a network packet. MPCE 426 compresses bi-directionally between clients and servers any TCP/IP based protocol. The TCP/IP based protocol includes, but is not limited to, Messaging Application Programming Interface ("MAPI"), File Transfer Protocol ("FTP"), HyperText Transfer Protocol ("HTTP"), Common Internet File System ("CIFS") protocol, Independent Computing Architecture ("ICA") protocol, Remote Desktop Protocol ("RDP"), Wireless Application Protocol ("WAP"), Mobile IP protocol, and/or Voice Over IP ("VoIP") protocol. MPCE 426 may additionally or alternatively provide compression of Hypertext Markup Language ("HTML") based protocols, markup languages (e.g., Extensible Markup Language ("XML"), a high-performance protocol, any payload of or any communication using a TCP and/or IP based protocol.

High speed layer 2-7 Integrated Packet Engine ("IPE") 428 is responsible for managing the kernel-level processing of packets received and transmitted by network appliance 400 via network ports 444. IPE 428 may comprise a buffer for queuing one or more network packets during processing, such as for receipt of a network packet or transmission of a network packer. Additionally, IPE 428 is in communication with one or more network stacks 434 to send and receive network packets via network ports 444. IPE 428 works in conjunction with encryption engine 422, cache manager 420, policy engine 424 and multi-protocol compression logic 426. In particular, encryption engine 234 is configured to perform SSL processing of packets. Policy engine 424 is configured to perform functions related to traffic management such as request-level content switching and request-level cache redirection. Multi-protocol compression logic 426 is configured to perform functions related to compression and decompression of data.

IPE 428 includes a timer 430 which provides one or more time intervals to trigger the processing of incoming (i.e., received) or outgoing (i.e., transmitted) network packets. In some scenarios, operations of the encryption engine 422, cache manager 420, policy engine 424 and multi-protocol compression logic 426 may be performed responsive to the timer 430 and/or the packet engine 428.

In contrast to kernel space 404, user space 402 is the memory area or portion of OS used by user mode applications or programs otherwise running in user mode. A user mode application may not access kernel space 404 directly and uses service calls in order to access kernel services. As shown in FIG. 4, user space 402 includes a Graphical User interface ("GUI") 408, a Command Line Interface ("CLI") 410, shell services 412, health monitoring program 414, and system daemon services 416.

GUI 408 and CLI 410 provide a means by which a system administrator or other user can interact with and control the operation of network appliance 400. GUI 408 may be any type and form of graphical user interface and may be presented via text, graphical or otherwise, by any type of program or application, such as a browser. The CLI 212 may be any type and form of command line or text-based interface, such as a command line provided by the operating system. The shell services 412 comprises the programs, services, tasks, processes or executable instructions to support interaction with the network appliance 400 or OS by a user via GUI 408 and/or CLI 410.

Health monitoring program 414 is used to monitor, check, report and ensure that network systems are functioning properly and that users are receiving requested content over a network. Health monitoring program 414 comprises one or more programs, services, tasks, processes or executable instructions to provide logic, rules, functions or operations for monitoring any activity of network appliance 400. For example, the health monitoring program 414 may (a) intercept and inspect any network traffic passed via the network appliance 400, (b) call any Application Programming Interface ("API") to determine a state, status, or health of any portion of network appliance 400, and/or (c) check any status, error or history logs provided by any program, process, service or task to determine any condition, status or error with any portion of network appliance 400.

System Daemon Services ("SDSs") 416 are programs that run continuously or in the background and handle periodic service requests received by network appliance 400. For example, SDSs 416 may (a) forward requests to other programs or processes, and/or (b) perform continuous or periodic system wide functions (e.g., network control).

As shown in FIG. 4, an ECN module 450 is also provided in the kernel space 404. The ECN module 450 is generally configured to modify TCP/IP headers of all incoming TCP connections from clients to an intermediary network (e.g., a WAN) to support ECN. For the outgoing connections, the ECN based TCP/IP headers are removed so that the client/server machines are not aware of TCP modifications to support ECN.

If a packet gets acknowledged with the ECN bit being set ("ECE bit") then the packet is dropped or discarded in the network appliance so that the client does not receive an acknowledgement for the packet and thinks as if a packet drop has occurred. The client now assumes that there is congestion in the network, reduces the congestion window, and retransmits the packet. However, the ECN proxy in the network appliance now drops the packet as an ECN-based proxy 452 is aware that the acknowledgement for the packet was intentionally dropped. In effect, there is no packet drop on the intermediary network (e.g., WAN) link, but the ECN-based proxy has emulated a packet drop to the client. Thus without any bandwidth loss (packet loss), the ECN-based proxy 452 delivers the packets in the WAN without the client being ECN aware.

Further, if there is a virtual path switch for that connection because it finds a better virtual path, then the ECN markings are ignored as the network appliance is about to switch to a new path. This is because the congestion is seen in the old path and not in the new path.

Referring now to FIGS. 5A-5B, there are provided functional block diagrams of an exemplary architecture for an ECN module 500. ECN module 450 of FIG. 4 is the same as or similar to ECN module 500. As such, the discussion of ECN module 500 is sufficient for understanding ECN module 450.

As shown in FIGS. 5A-5B, ECN module 500 comprises a packet processing engine 504, an ECN-based proxy 506, a path quality estimator 510 and a path switcher 512. ECN-based proxy 452 of FIG. 4 is the same as or similar to ECN-based proxy 506. As such, the discussion of ECN-based proxy 506 is sufficient for understanding ECN-based proxy 452.

Referring now to FIG. 5A, a non-ECN packet 502 is received by the packet processing engine 504 during operation of the ECN module 500. The packet processing engine 504 processes the received packet 502 so as to convert it into a packet 506 with ECN functionality. Non-ECN to ECN packet conversion techniques are well known in the art, and therefore will not be described herein. Any known or to be known Non-ECN to ECN packet conversion technique can be used herein without limitation.

Packet 506 is then passed to the ECN-based proxy 508. The ECN-based proxy 508 marks an ECN bit in the header of packet 506 if information 520 indicates that congestion was detected by the path quality estimator 512. The packet 510 (with or without the marked ECN bit) is then passed to the path quality estimator 512. The path quality estimator 512 determines which path A, B, . . . , N in a network (e.g., network 108 of FIG. 1) the packet 510 should be assigned. This determination is made based on the priority of the packet 510, the quality of service requirements of the packet 510 and/or the actual quality of each path A, B, . . . , N. Thereafter, the packet 510 and a path designation 514 are sent from the path quality estimator 512 to the path switcher 512. The path designation 514 specifies a particular path of the paths A, B, . . . , N over which the packet 510 should be communicated. The path switcher 512 performs operations to communicate the packet 510 over the designated path (e.g., path A).

Referring now to FIG. 5B, the packet processing engine 504 receives a packet 552 with ECN functionality. Packet 552 is processed to determine whether or not an ECN bit in its header is marked. Thereafter, the packet processing engine 504 sends packet 552 and information 554 to the ECN-based proxy 508. The ECN-based proxy 508 also receives information 530 from the path quality estimator 512 indicating that the quality of a network link indicates congestion will occur in the near future. In response to this information 530, the ECN-based proxy 508 generates a packet drop notification 556 if information 554 indicates that the ECN bit, in packet 552 was marked. The packet drop notification 556 is then sent to the path quality estimator 512. The path quality estimator 512 selects a path A, B, . . . , N over which the packet drop notification 556 should be sent. This selection is made based on the priority of the packet drop notification 556, the quality of service requirements of the packet drop notification 556 and/or the actual quality of each path A, B, . . . , N. Subsequently, the packet drop notification 556 and a path designation 558 are communicated from the path quality estimator 512 to the path switcher 512. The path switcher 512 performs operations to communicate the packet drop notification 556 over the designated path (e.g., path A).

Other operations performed by the ECN module 500 will become apparent as the discussion progresses. For example, the ECN module 500 may perform operations to negotiate a TCP connection and ECN functionality.

Exemplary Methods for Link Status Early Detection

As noted above, the present solution concerns implementing systems and methods for early detection of link status of multiple paths through an ECN. A signaling diagram is provided in FIG. 6 which is useful for understating such implementing systems and methods.

Figure 6:
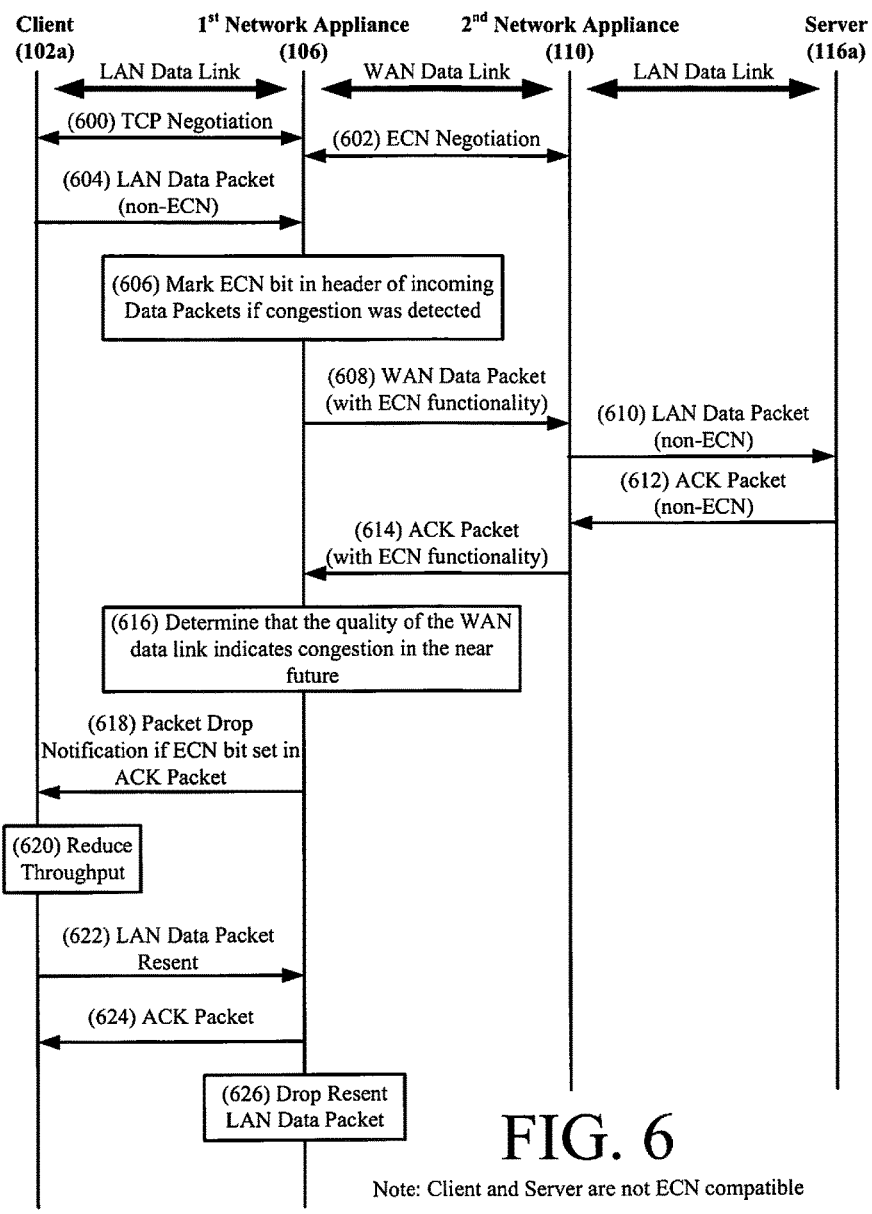
FIG. 6 is an illustration showing exemplary signaling between network nodes.

FIG. 6 shows that a client (e.g., client 102a of FIG. 1) is communicatively coupled to a first network appliance (e.g., network appliance 106 of 1) via a LAN data link. The first network appliance is communicatively coupled to a second network appliance (e.g., network appliance 110 of FIG. 1) via a WAN data link. The second network appliance is communicatively coupled to a server (e.g., server 116a of FIG. 1) via a LAN data link. The client and server re not ECN aware or compatible.

During operation, the client and first network appliance perform TCP negotiations to set up a TCP/IP connection over a LAN, as shown by reference numeral 600. TCP negotiation is well known in the art, and therefore will not be described herein. Any known or to be known method for TCP negotiation can be used herein without limitation.

The first network appliance also performs ECN negotiations with the second network appliance to set up an ECN capability between the first and second network appliances, as shown by reference numeral 602. ECN negotiations and ECN capabilities are well known in the art, and therefore will not be described herein. Any known or to be known ECN negotiation technique can be used herein without limitation. The ECN capability generally allows the first and second network appliances to set a mark in an IP header of a packet instead of dropping the packet in order to signal impending congestion.

Next as shown by reference numeral 604, a non-ECN LAN data packet is sent from the client to the first network appliance over the LAN data link. At the first network appliance, the LAN data packet is converted, transformed or translated into a WAN data packet with ECN functionality. If congestion was detected, an ECN bit of the WAN data packet's header is marked as shown by reference numeral 606. The WAN data packet is then sent from the first network appliance to the second network appliance via the WAN data link, as shown by reference numeral 608. The second network appliance processes the WAN data packet to convert it into a LAN data packet. The LAN data packet is then forwarded from the second network appliance to the server as shown by reference numeral 610. In response to the reception of the LAN data packet, the server communicates an ACK packet to the second network appliance, as shown by reference numeral 612.

The ACK packet is processed by the second network appliance to convert it from a non-ECN compatible LAN formatted packet to a WAN compatible packet with ECN functionality. In this regard, an ECN bit in the WAN formatted ACK packet may be marked by the second network appliance if congestion was detected. The ACK packet with ECN functionality is then sent from the second network appliance to the first network appliance via the WAN data link, as shown by reference number 614.

Upon receipt of the ACK packet, the first network appliance determines whether or not the quality of the WAN data link indicates congestion in the near future, as shown by reference number 616. If the WAN data link's quality indicates congestion in the near future, then the first network appliance generates a packet drop notification as shown by reference number 618. The packet drop notification is communicated from the first network appliance to the client via the LAN data link. In response to the packet drop notification, the client performs operations to reduce its throughput and resend the data packet identified in the packet drop notification as being dropped, as shown by reference numbers 620 and 622. Subsequently, the first network appliance sends and ACK packet to the client and drops the resent LAN data packet, as shown by steps 624 and 626.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for early detection of link status of multiple paths through a first network, comprising:
   receiving, by a first network appliance, a first packet sent from a second network appliance over a first data link established between the first and second network appliances which support Explicit Congestion Notification ("ECN");
   determining, by the first network appliance, whether a quality of the first data link indicates future congestion in the first network;
   communicating a packet drop notification from the first network appliance to a first end node over a second data link established in a second network different from the first network if (a) the quality of the first data link does indicate future congestion and (b) an ECN bit contained in a header of the first packet is marked;
   receiving, by the first network appliance, a second packet resent from the first end node in response to the packet drop notification; and
   performing operations by the first network appliance to drop the second packet since the second packet was already successfully communicated to the second network appliance;
   wherein the first end node is incompatible with ECN and the packet drop notification falsely indicates that a second packet has been dropped by the first network appliance.

2. The method according to claim 1, wherein the packet drop notification cause the first end node to reduce a throughput.

3. The method according to claim 1, further comprising communicating an ACK packet from the first network appliance to the first end node in response to a reception of the second packet.

4. The method according to claim 1, further comprising:
   receiving a third packet send from the first end node to the first network appliance over the second data link; and
   performing operations by the first network appliance to mark an ECN bit contained in a header of the third packet if congestion in the first network is detected.

5. The method according to claim 4, further comprising communicating the third packet with the marked ECN bit from the first network appliance to the second network appliance over the first data link.

6. The method according to claim 5, further comprising communicating the third packet from the second network appliance to a second end node over a third data link established in a third network different from the first network, the second end node being incompatible with ECN.

7. A system, comprising:
   first and second network appliances communicatively coupled via a first data link established on a first network that supports Explicit Congestion Notification ("ECN");
   wherein the first network appliance
      receives a first packet sent from the second network appliance over the first data link,
      determines whether a quality of the first data link indicates future congestion in the first network,
      communicates a packet drop notification to a first end node over a second data link established in a second network different from the first network if (a) the quality of the first data link does indicate future congestion and (b) an ECN bit contained in a header of the first packet is marked,
      receives a second packet resent from the first end node in response to the packet drop notification, and
      performs operations to drop the second packet since the second packet was already successfully communicated to the second network appliance;
   wherein the first end node is incompatible with ECN and the packet drop notification falsely indicates that a second packet has been dropped by the first network appliance.

8. The system according to claim 7, wherein the packet drop notification cause the first end node to reduce a throughput.

9. The system according to claim 7, wherein the first network appliance further communicates an ACK packet to the first end node in response to a reception of the second packet.

10. The system according to claim 7, wherein the first network appliance further:
    receives a third packet send from the first end node over the second data link; and
    performs operations to mark an ECN bit contained in a header of the third packet if congestion in the first network is detected.

11. The system according to claim 10, wherein the first network appliance further communicates the third packet with the marked ECN bit to the second network appliance over the first data link.

12. The system according to claim 11, wherein the third packet is communicated from the second network appliance to a second end node over a third data link established in a third network different from the first network, the second end node being incompatible with ECN.

* * * * *